DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 27, 1973

916. O.G. 1213

T916,009

LINEAR POLYESTERS HAVING A HIGH AFFINITY TOWARDS BASIC DYESTUFFS

Francesco Siclari, Barlassina, Bruno F. D'Alo, Palazzolo Milanese, and Alessandro Biggio, Cesano Maderno, Italy, assignors to Snia Viscosa Societá Nazionale Industria Applicazioni Viscosa S.p.A., Milan, Italy

Filed Apr. 24, 1973, Ser. No. 354,092

Claims priority, application Italy, Apr. 27, 1972, 23,643/72

Int. Cl. C08g *17/08*

U.S. Cl. 260—75 S

No Drawing. 10 Pages Specification

A method is disclosed for producing synthetic polymers of the polyester or polyether-ester type, which are adapted to be converted into filaments or fibers and which have a high affinity for basic dyestuffs and improved dyeing speed, and more particularly, polyethyleneterephthalate, in which a bicarboxylic or oxycarboxylic acid, or an ester-forming derivative thereof, and an aliphatic glycol are copolymerized with an aromatic compound having the general formula:

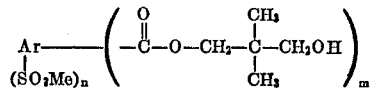

wherein *m* and *n* are equal to 1 or 2, Ar is an aromatic radical (such as phenylene and naphthylene) substituted by the sulphonic group or groups and Me is a hydrogen atom, an alkali metal, or an alkaline earth metal. The colors obtained are extremely brilliant and have an outstanding fastness to washings.